Ronald A. Gulick
John M. Sheesley
INVENTORS

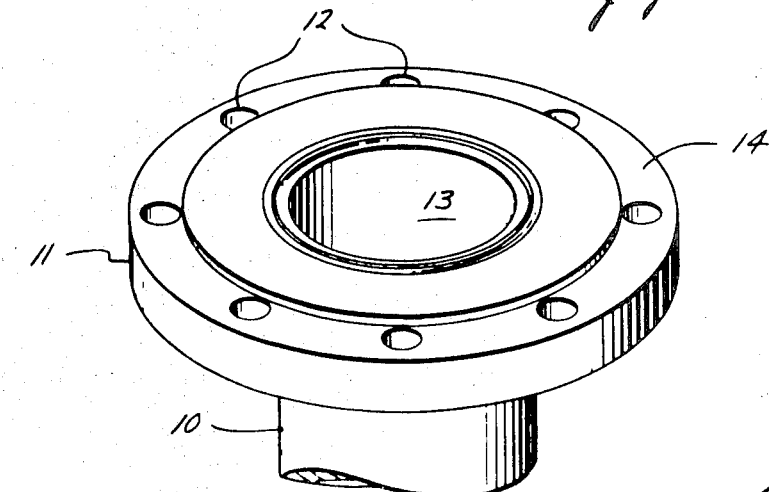
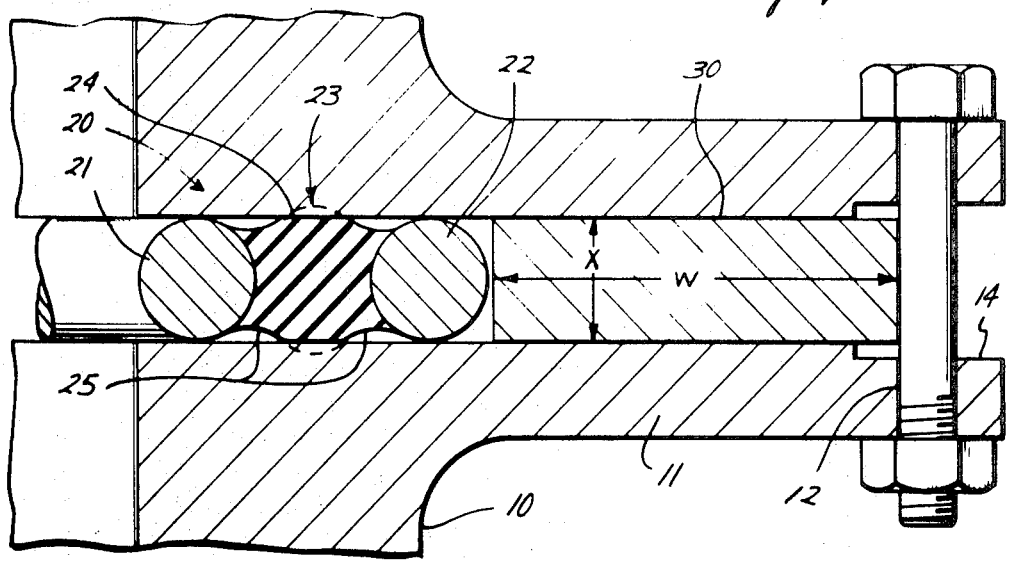
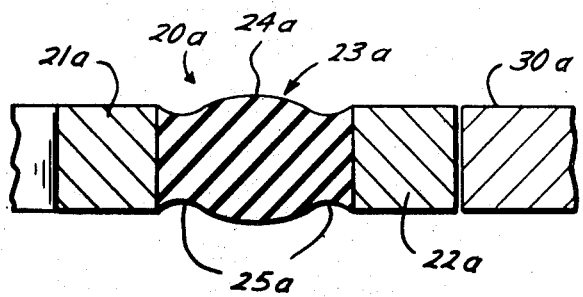
Ronald A. Gulick
John M. Sheesley
INVENTORS
BY Robert B. Dickerson
ATTORNEY

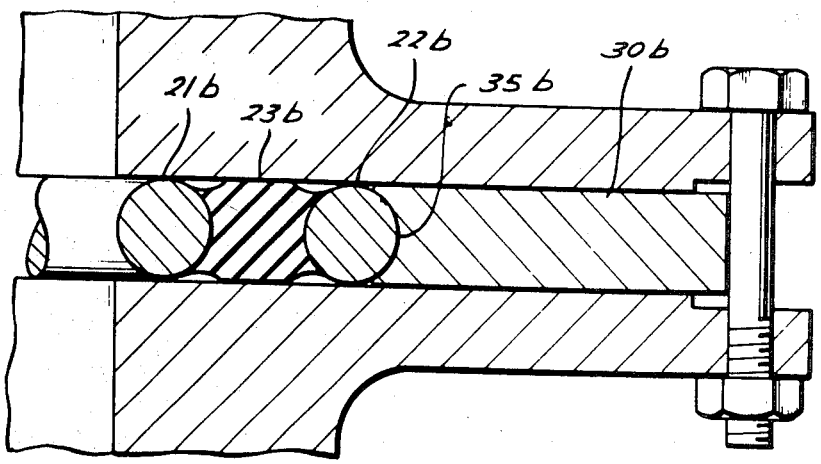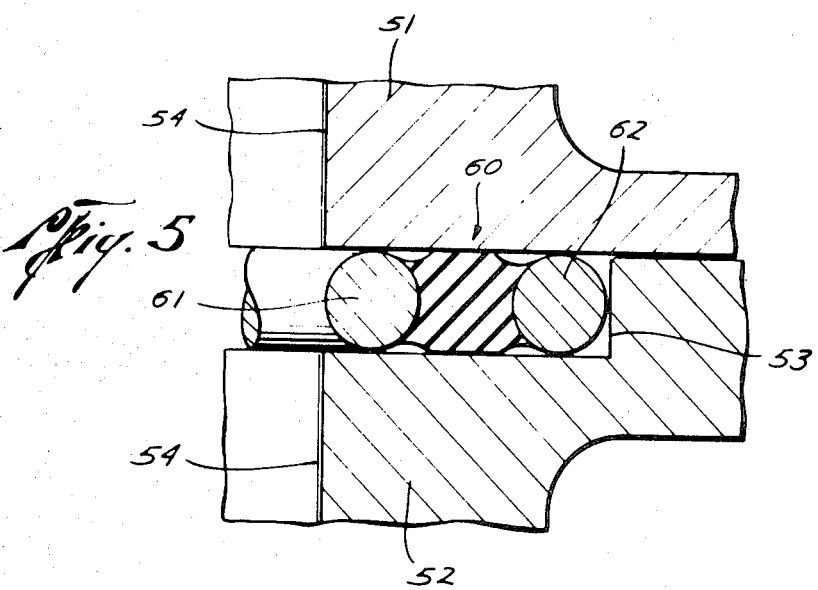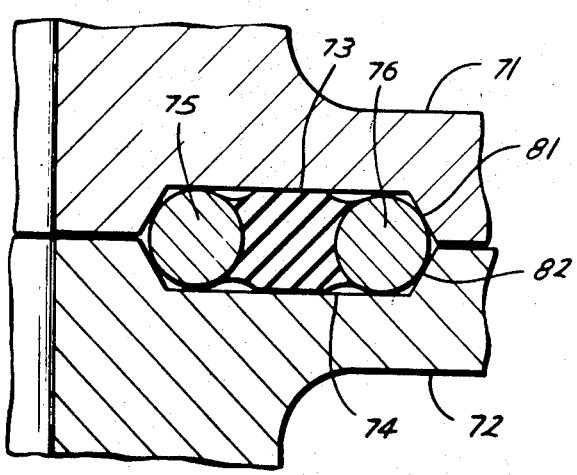

United States Patent Office 3,531,133
Patented Sept. 29, 1970

3,531,133
SEAL
John M. Sheesley, Houston, and Ronald A. Gulick, Sugarland, Tex., assignors to Research Engineering Company, Houston, Tex., a corporation of Texas
Continuation-in-part of applications Ser. No. 685,888, Nov. 27, 1967, and Ser. No. 695,421, Jan. 3, 1968. This application Nov. 8, 1968, Ser. No. 774,284
Int. Cl. F16l *19/02;* F16j *15/00*
U.S. Cl. 277—180
5 Claims

ABSTRACT OF THE DISCLOSURE

Seal having concentric non-extrusion rings interconnected by a deformable sealing element having an undulating configuration. Variations utilize only a single non-extrusion ring, and/or substitute extrudible material of similar configuration for such non-extrusion rings. Further, an annular spacer ring may be positioned intermediate the radially outermost of said concentric rings and the bolts or fasteners used to join mated flanges. Such flanges may be grooved or recessed to receive the seal.

BACKGROUND OF THE INVENTION

Field of the invention

This application is a continuation-in-part of applicants' prior copending application entitled Seal, filed Nov. 27, 1967, under Ser. No. 685,888, and of prior copending application entitled Seal, filed Jan. 3, 1968, under Ser. No. 695,421.

Many industrial applications require that flanged elements be joined together. For example, section after section of flanged pipe are necessarily linked to form a conduit of any length. When the adjacent surfaces of the flanges of adjacent links are joined, as by bolts passing therethrough, seals are normally provided intermediate such adjacent surfaces to prevent leakage into and/or from the conduit portion of the pipe. Sometimes these seals, such as O rings, are placed within grooves provided such surfaces. This invention is concerned with such seals. Examples of the prior art may be found in U.S. Pat. Nos. 685,610; 1,834,581; 2,269,486; 2,291,709; 2,307,440; 2,-513,178; 2,914,350; 3,033,582; 3,074,427; 3,153,541; 3,-158,380; 3,231,289; 3,279,805; and 3,394,941.

Description of the prior art

Annular sealing means concentrically surrounding a pipe opening have been described in the prior art, for example, see U.S. Pat. No. 2,717,793. Such seals normally include a deformable portion which may be clamped between the adjacent flange faces. The material may flow within a positioning element, which may be an annular ring having a groove which contains the deformable portion. Such an arrangement contemplates the positioning element being fixed in size. This, then requires stocking a large number of sizes, even for use on pipe having the same internal diameter, inasmuch as the diameter of the outside bolt circle may vary.

SUMMARY OF THE INVENTION

This invention contemplates a sealing element of fixed internal diameter. This element includes a deformable central portion joined to a pair of concentric ring members. The concentric members, according to various embodiments, may be of the metallic non-extrusion type, or one or more of them may be deformable such as softer metals, suitable plastics or the like. In one embodiment this sealing element may be positioned within a groove or recess provided in one or both of the joined surfaces. In another embodiment, an outer spacer ring may be affixed, as by welding or by less permanent means such as snap-fitting, to the radially outermost ring member. The radially internal surface of the spacer ring may be conformed so as to correlate with or accommodate the external configuration of the outermost ring member of the sealing element, or said internal surface may simply be so configured as to permit the ring member to be snapped into engagement therewith. This means that a sealing element of a fixed diameter may be used with all pipe having the same appropriate internal diameter. For conduits having flanges of differing diameters, outer spacer rings may be available in differing sizes. Thus, the quantity of material that needs be kept in stock may be substantially reduced, resulting in a more economical operation.

DESCRIPTION OF THE DRAWINGS

FIG. 1 is a broken perspective of one flanged end of a pipe section, with one embodiment of the seal of this invention in place thereon;

FIG. 2 is an axial section through the sealing element and adjacent spacer ring of FIG. 1;

FIG. 3 is an axial section through a modified version of the sealing element and spacer ring;

FIG. 4 is an axial section similar to FIG. 2, with a modified form of spacer ring;

FIG. 5 is a further broken axial section depicting the sealing element utilized with a single grooved flange;

FIG. 6 is a broken vertical section showing the sealing element as positioned within the annulus formed by adjacent flange grooves;

DESCRIPTION OF THE INVENTION

Figure 7:
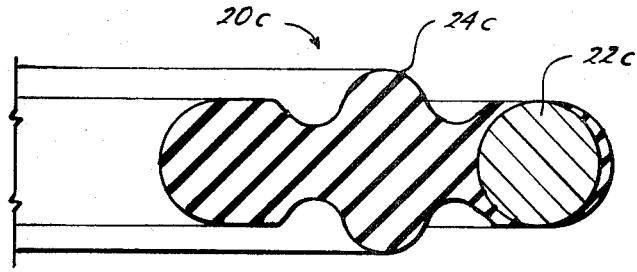
FIG. 7 is a vertical section through a modified sealing element.
Figure 8:
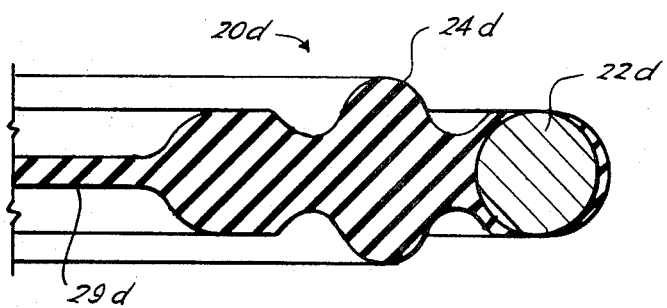
FIG. 8 is a vertical section through a modified sealing element with diaphragm.
Figure 9:
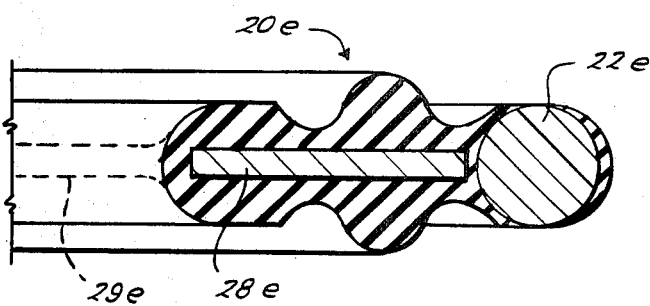
FIGS. 9 and 10 are also vertical sections through modifications of the sealing element.

Looking first at FIG. 1, one end of a generalized section of pipe 10 is seen to have a flange 11 affixed thereto or integral therewith. Bolt holes 12 are annularly spaced around and pass through flange 11, allowing the fastening of an adjacent section of flanged conduit. One purpose of this invention, and similar devices, is to prevent material passing through a conduit from leaking out at junctures, or from outside matter there contaminating such material. Numeral 13 identifies the conduit passing through pipe 10. The seal would rest adjacent surface 14 of flange 11, and intermediate such surface and a similar one on the linked pipe flange not shown in FIG. 1. Certain embodiments discussed hereafter are designed to be used in situations where there is no such conduit as 13, and, therefore, the sealing element may be modified as hereafter shown.

The sealing device of one form of this invention includes two general components, a sealing element 20 and a spacer ring 30. Sealing element 20 is generally annular in configuration, is normally positioned at or closely adjacent, and concentric with conduit 13 of the pipe sections to be joined and sealed. This element 20 includes spaced annular sealing or retainer rings, 21 being the radially innermost in FIG. 2 and 22 the outermost. At least in FIGS. 1 through 6 such sealing rings are normally of the non-extrusion type, e.g., hard metallic. These retainer rings are connected by an annular deformable elastomeric seal 23, rubber or many plastics forming suitable material therefor. The outer surface of seal 23 is undulating, with crown portion 24 extending somewhat beyond the extent of retainer rings 21 and 22. Valleys 25 are intermediate the crown of seal 23 and the retainer rings. These valleys may receive material that flows or is extruded from the crown, when seal 23 is compressed between adjacent pipe flanges.

In FIGS. 1–4, concentric with sealing element 20, and radially outward thereof, is annular spacer ring 30. This member is substantially an annular plate having a thickness "X" smaller by an incremental amount than the thickness or diameter of retainer rings 21, 22. The spacer ring 30 would have a width "W" extending from or closely adjacent the outermost retainer ring to the bolt circles formed by bolts passing through the holes 12 in the adjacent pipe flanges. These spacer rings, according to some uses, may be joined, as by welding to the outermost retainer ring, this joinder not being depicted in the drawings, and, in fact, non-integral operation described hereafter often offers advantages in utilization and operation.

The modification of FIG. 3 demonstrates that the retainer rings may have differing configurations. Subscripts have been added in FIG. 3 to the basic numerals applied in FIG. 2.

Further subscripts have been utilized in FIG. 4 to illustrate an embodiment of the spacer ring. Here retainer rings $21_b$ and $22_b$ are joined by seal $23_b$. Surrounding outer retainer ring $22_b$ is spacer ring $30_b$, similar in operation to that of FIG. 2. It should be noted that radially innermost side $35_b$ of spacer ring $30_b$ is concave to accommodate ring $22_b$. This permits the sealing element to be snapped into the spacer ring. The actual shape may vary, the point being that the two elements may have correlative configurations of their adjacent surfaces, or the spacer ring surface should be so configured as to accommodate or receive and position the adjacent retainer ring.

In general thus far, the sealing element 20 of the proper dimension may be chosen solely as a function of the bore diameter of the linked pipe sections. This element would be concentric with and outwardly of the bore of the conduit portion of such sections. Inasmuch as the diameters of the outside bolt circle may vary, some allowance must be made in terms of material stocked. Some prior seals have fabricated the sealing element and spacer ring into a single unit. In this invention, the absolute number of combination sealing element-spacer rings is reduced. In any case, the proper sealing element 20, 20a or 20b is first selected. It may be joined by welding (not shown) to the properly sized spacer ring, snapped into the same as permitted in FIG. 4, or may simply rest adjacent thereto. The assembly would then be positioned adjacent surface 14 of one pipe flange. On the other flange being bolted to the first, the outer circumference of the spacer ring would rest at or inside the circle of bolts passing through holes 12. Crown 24 of seal 23 would be compressed between adjacent flange faces so as to flow into valleys 25, the pressure between the seal and flange surfaces effecting a seal. Further, compression type seals would occur between the flange faces and the retainer rings 21, 22. This effectively bars leakage of the elastomeric seal 30. This seal is enhanced by the spacer ring being made a bit thinner than the retainer rings. This permits the retainer rings to act as seals as well as functioning as non-extrusion rings for the elastomeric or plastic sealant material. The arrangement of metal-to-metal seals just inside and outside of the elastomeric seal permits use under higher pressures, in that a seal may continue even on partial deterioration of the rubber (or similar material) portion 24.

A metal-to-metal seal occurring inside and outside of a deformable seal is illustrated by the sealing element used alone in FIGS. 5 and 6. In FIG. 5, pipe sections 51 and 52 may be joined by bolts, not shown. One of these flanges, or combination of flange and bulkhead fittings, may be annularly recessed at 53 near or adjacent to bore 54, which communicates with a like bore in section 51. Within this recess a sealing element 60 is placed. This sealing element may be comprised of the same constituents as member 20 or $20_a$ of FIG. 2 or 3. On pressing the flange faces of the two pipe sections together, the central elastomeric portion deforms and makes a seal. Also, the flanges, along with sealing rings 61, 62, form a metal-to-metal seal. This latter seal is enhanced in FIG. 6 by forming annular cuts or recesses 73, 74 within the flanges of pipe sections 71, 72. On these flanges being pressed together, not only is the elastomeric pressure acting seal provided as well as the metal-to-metal seals between the pipe flanges and sealing rings 75, 76, but also this metal-to-metal seal becomes a pressure acting seal. As the pressure increases, the sealing ring, such as 76, deforms radially outward to produce a bearing stress between it and recess portions 81, 82, sufficiently high to effect a seal. On initial makeup, these surfaces 81, 82, are slightly smaller in diameter than the mating outer surface of ring 76, thus an initial contact is made when the flanges are assembled. Such sealing permits operation at extremely high pressures. The beveled sides of the upper flange grooves, such as 81, are, prior to tightening the bolts, resting on the outer diameter of rings 75, 76. On clamping the flanges together, the flanges, acting on the sealing rings, seal the elastomer and allowing it, member 73, to perform the low pressure sealing requirements. Later on, as pressure rises the flanges, along with the sealing rings, accomplish the high pressure sealing requirements.

Figure 10:
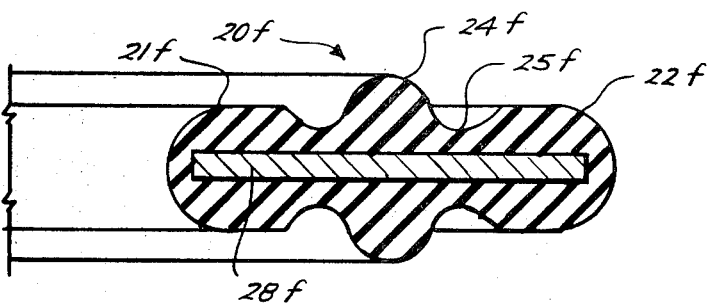

Looking now at FIGS. 7, 8, 9 and 10, modifications of the basic sealing element are shown as $20_c$, $20_d$, $20_e$ and $20_f$, respectively. In FIG. 7, only a single metal, or material having similar properties non-extrusion retainer ring is shown at $22_c$. The elastomer comprising the deformable portion is bonded to the sealing ring, said elastomer including its usual crown portion $24_c$ as well as being formed into an inner annular ring portion comparable to member $21_b$ of FIG. 4, but being formed of the same general material as crown section $24_c$. The absence of the inner metal retainer ring is particularly useful in the embodiment of FIG. 8. There, like FIG. 7, a central deformable elastomeric seal portion has a crown $24_d$, said central seal portion being attached, as by bonding, to an outer metal retaining ring $22_d$. Said elastomer may substantially encircle said retaining ring. Opposite ring $22_d$, the elastomer may be similarly configured, and may have attached or joined to its inner diameter a membrane or diaphragm $29_d$. Such a configuration would have utility in systems other than linked pipe sections having communicating conduits. Were an inner metal retaining ring present, diaphragm $29_d$ would be more difficult to attach thereto, than to the elastomer itself. Should additional internal reinforcement be necessary, yet the internal metal ring be undesirable, as in the embodiment of FIG. 9, the diaphragm $29_e$ may join the inner diameter of sealing element $20_e$. Outer sealing ring $22_e$ is shown bonded to the elastomeric material forming the central sealing portion. Washer $28_e$, preferably but not essentially annular in form is embedded within the deformable material. FIG. 10, representing a low pressure embodiment, has no inner or outer metal sealing ring. The undulating configuration is retained, with the central deformable sealing portion having crown $24_f$, valleys $25_f$, inner and outer annular ring-like portions $21_f$ and $22_f$. For internal reinforcement, washer member $28_f$ may extend substantially the thickness of the sealing element.

Figure 11:
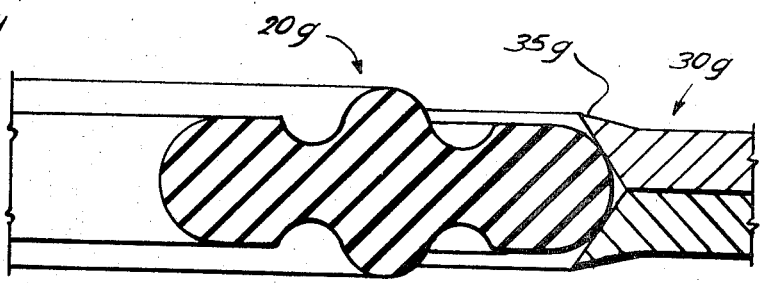
FIGS. 11, 12, 13, 14, and 15 are vertical sections through additional sealing element and spacer ring embodiments.
Figure 12:
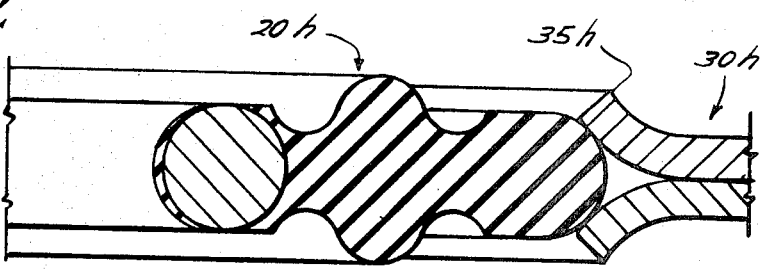
Figure 13:
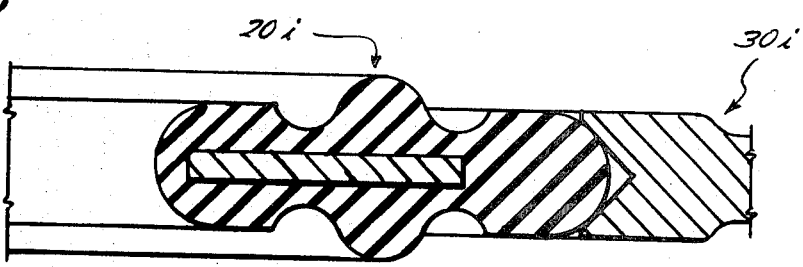
Figure 14:
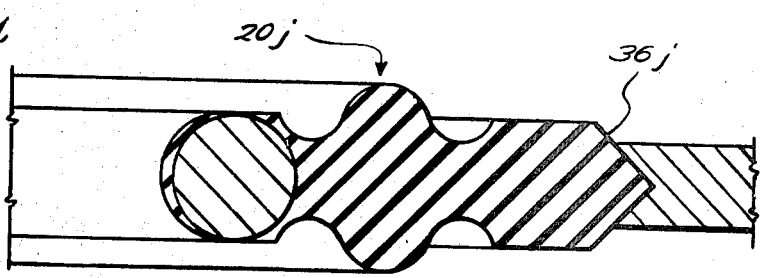
Figure 15:
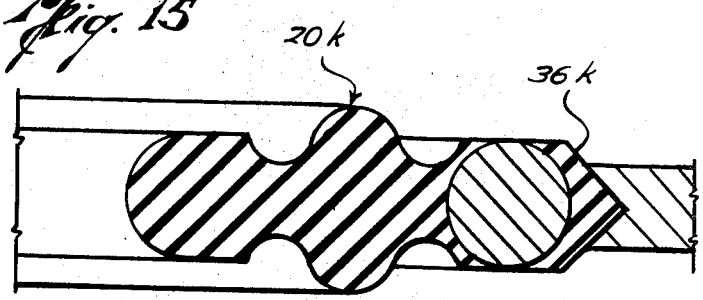

Embodiments of the spacer-ring, sealing element combination are shown in FIGS. 11, 12, 13, 14 and 15. In each, a sealing element is shown, namely $20_g$, $20_h$, $20_i$, $20_j$ and $20_k$, respectively. In FIGS. 11, 12 and 13, the outer ring of the sealing element is slipped, fitted or snapped within a recess provided the spacer ring $30_g$, $30_h$ or $30_i$ Spacer rings $30_g$ and $30_h$ are formed of parallel plates, and each plate includes an annular tip 35 which may be crimped inwardly, by flange pressure, to securely retain the respective sealing element. Additionally, in FIGS. 14 and 15, a wedge shaped tip portion 36 is provided the outer ring portion of the central sealing element, said outer ring may be the metal ring of FIG. 8 or the elastomeric such as in FIG. 10. Further, said wedge shaped tip may be annular, or periodically interrupted, such as by having such wedge members, of relatively narrow width, affixed to the outer diameter of the ring member every 90 degrees. The purpose of member 36 is essentially to assist in snapping the central seal element into the spacer ring, so it is felt the better practice that the mating surfaces of said wedge members and spacer rings be correlative, such as V-shaped in the case of FIG. 15.

Although a number of embodiments of this invention have been described, it should be obvious that many more modifications would be possible by one skilled in the art, without departing from the spirit of the invention. Therefore, it is intended that the scope of the invention be limited only by the following claims.

We claim:

1. A sealing device having a central sealing portion, and further integrally connected sealing portions linked to and positioned on opposite sides of said central portion and concentric therewith, each of said sealing portions being annular, and said central portion having a diameter in cross-section greater than the cross-sectional diameter of either of said further sealing portions, wherein:
said central portion is made, and of a deformable but substantially non-compressible elastomeric material;
linkages forming lateral extensions of elastomeric material between said central portion and said further portions, said linkages include valleys into which material from said central portion may flow when said central portion is subjected to axial compression;
said oppositely disposed further sealing portions having outer surfaces substantially comprised of the same material as said extensions of said central portion; and
at elast one of said oppositely disposed portions also includes an annular toroidal core of rigid, substantially non-extrudible material, embedded centrally within said one portion, extending therethrough, and occupying the greater portion of the cross-sectional area of said one portion.

2. The sealing device of claim 1 and including a rigidifying plate embedded within said central portion and annularly extending substantially therearound.

3. The sealing device of claim 2 wherein said rigidifying plate also is embedded within one of said oppositely disposed sealing portions and constitutes an axial extension of said plate embedded in said central portion.

4. The sealing device of claim 1 and including a web portion of deformable material extending axially inwardly of the radially innermost of said oppositely disposed sealing portions.

5. The sealing device of claim 3 and including a web portion of deformable material extending axially inwardly of the radially innermost of said oppositely disposed sealing portions.

References Cited

UNITED STATES PATENTS

| | | | |
|---|---|---|---|
| 368,189 | 8/1887 | Carter | 277—198 |
| 2,196,953 | 4/1940 | Bohmer et al. | 277—180 |
| 2,442,312 | 5/1948 | Price | 277—11 |
| 2,599,767 | 6/1952 | Long | 277—235 |
| 3,078,110 | 2/1963 | Starr. | |
| 3,153,541 | 10/1964 | Rudder | 277—180 |
| 3,167,322 | 1/1965 | Aichroth | 277—180 |
| 3,195,906 | 7/1965 | Moyers | 277—180 |
| 3,248,119 | 4/1966 | Smith et al. | 277—180 |
| 3,279,805 | 10/1966 | Quinson | 277—162 |

FOREIGN PATENTS

| | | |
|---|---|---|
| 687,391 | 5/1964 | Canada. |
| 937,707 | 9/1963 | Great Britain. |
| 547,066 | 8/1942 | Great Britain. |
| 836,584 | 6/1960 | Great Britain. |
| 1,290,961 | 3/1962 | France. |

SAMUEL B. ROTHBERG, Primary Examiner

U.S. Cl. X.R.

277—209, 235